(12) United States Patent
Yeh et al.

(10) Patent No.: US 10,332,296 B2
(45) Date of Patent: Jun. 25, 2019

(54) OVERLAYING MULTI-SOURCE MEDIA IN VRAM

(71) Applicant: Ubitus Inc., Grand Cayman (KY)

(72) Inventors: Chung-Chou Yeh, Taipei (TW); Yu-Ju Tseng, Taipei (TW); Kai-Fang Cheng, Taipei (TW)

(73) Assignee: Ubitus Inc., Grand Cayman (KY)

( * ) Notice: Subject to any disclaimer, the term of this patent is extended or adjusted under 35 U.S.C. 154(b) by 0 days.

(21) Appl. No.: 15/971,640

(22) Filed: May 4, 2018

(65) Prior Publication Data

US 2018/0253880 A1  Sep. 6, 2018

Related U.S. Application Data

(63) Continuation-in-part of application No. 15/202,080, filed on Jul. 5, 2016, now abandoned.

(51) Int. Cl.
| | |
|---|---|
| *G06T 11/60* | (2006.01) |
| *G06T 1/20* | (2006.01) |
| *G06T 1/60* | (2006.01) |

(52) U.S. Cl.
CPC ............ *G06T 11/60* (2013.01); *G06T 1/20* (2013.01); *G06T 1/60* (2013.01)

(58) Field of Classification Search
CPC ............ G09G 5/14; G09G 2340/10; G09G 2340/125; G06T 11/60; H04N 5/44504
See application file for complete search history.

(56) References Cited

U.S. PATENT DOCUMENTS

| | | | | |
|---|---|---|---|---|
| 5,563,992 A | * | 10/1996 | Murata | G06T 11/00 345/630 |
| 5,754,186 A | * | 5/1998 | Tam | G06F 3/0488 345/629 |
| 5,912,710 A | * | 6/1999 | Fujimoto | G09G 5/02 348/445 |
| 6,072,489 A | * | 6/2000 | Gough | G06F 3/0481 715/803 |
| 6,911,984 B2 | | 6/2005 | Sabella et al. | |
| 2003/0100963 A1 | * | 5/2003 | Potts | G06F 3/1438 700/83 |
| 2004/0179018 A1 | * | 9/2004 | Sabella | G09G 5/393 345/536 |
| 2006/0028583 A1 | * | 2/2006 | Lin | G09G 5/14 348/584 |
| 2007/0064017 A1 | | 3/2007 | Inamoto et al. | |
| 2007/0291172 A1 | * | 12/2007 | Kouzimoto | B60R 11/02 348/488 |
| 2007/0296874 A1 | * | 12/2007 | Yoshimoto | G09G 3/003 348/739 |
| 2008/0130922 A1 | * | 6/2008 | Shibata | H04R 5/023 381/302 |
| 2009/0262045 A1 | * | 10/2009 | Nakano | B60R 11/0235 345/32 |
| 2010/0149301 A1 | * | 6/2010 | Lee | H04L 12/1818 348/14.08 |
| 2010/0210357 A1 | * | 8/2010 | Slough | A63F 13/12 463/30 |

(Continued)

*Primary Examiner* — Todd Buttram
(74) *Attorney, Agent, or Firm* — Lawrence Gabuzda; Michael Mauriel; Mauriel Kapouytian Woods LLP

(57) ABSTRACT

Methods, apparatuses, and computer program products for overlaying multisource media in VRAM are described.

21 Claims, 9 Drawing Sheets

(56) References Cited

U.S. PATENT DOCUMENTS

| | | | |
|---|---|---|---|
| 2012/0044325 A1* | 2/2012 | Tatsuta | H04N 13/0059 |
| | | | 348/43 |
| 2013/0311308 A1* | 11/2013 | Huang | G06Q 30/0251 |
| | | | 705/14.73 |
| 2015/0241951 A1 | 8/2015 | Noro et al. | |
| 2017/0064217 A1* | 3/2017 | Ota | H04N 5/2628 |
| 2017/0286279 A1* | 10/2017 | Allison | G06F 11/3688 |
| 2018/0012327 A1* | 1/2018 | Yeh | G06T 1/20 |
| 2018/0147483 A1* | 5/2018 | Osman | A63F 13/497 |

* cited by examiner

OVERLAYING MULTI-SOURCE MEDIA IN VRAM

This application is a continuation-in-part of application Ser. No. 15/202,080, filed Jul. 5, 2016. The entire contents of this application are hereby incorporated herein by reference.

BACKGROUND

A platform, such as a cloud content platform, may need to deliver multiple multimedia content items to a target device simultaneously.

For example, a cloud gaming platform may need to stream a game scene with an advertisement to customers' devices. The game scene and the advertisement may come from different video sources. It may be desired that the advertisement is overlaid on the game scene, or that the game scene is underlaid beneath the advertisement.

The conventional overlay/underlay process may work like this: Capture a primary image from a primary video source, for example a game, and copy it to a frame buffer in System RAM. Then capture an overlay/underlay (second) image from the overlay/underlay (second) video source, for example an advertisement and blend the overlay/underlay image onto the primary image in the frame buffer. Finally, encode the new image in the frame buffer into the target video. The capturing, copying, and blending require significant extra effort by the system. System bus, system memory, and CPU resources are impacted. In a high CCU (concurrent user) system, this extra effort can cause low performance and high power consumption by the server.

Therefore, a new and improved system and method is desired to provide a more efficient overlay/underlay process.

SUMMARY

Embodiments of the present invention provide systems and methods for efficiently overlaying multimedia content on a video source generated by an application program.

Embodiments of the present invention also provide systems and methods for efficiently underlaying multimedia content beneath such a video source, or for blending multimedia content with the video source.

According to embodiments of the present invention, there is provided a multimedia content processing system and a multimedia content processing method, which perform the overlay/underlay in VRAM, thereby reducing system bus, system memory, and CPU usage.

In embodiments of the inventive system and method, the primary source is rendered in VRAM by an application program, and then the overlay/underlay source(s) are rendered and blended to the primary source in VRAM at a specified time and position.

The blending is performed at the same location of the primary source in VRAM, so no extra buffer is needed. This improves system performance and reduces power consumption, through reduced system bus, system memory, and CPU usage.

The overlay/underlay result is sent to a video back buffer or frame buffer and then encoded and sent to system RAM, directly presented on a display device, or fed back to the same VRAM location as part of an iterative overlay process.

DETAILED DESCRIPTION

Embodiments of the present invention provide a system and method to overlay/underlay multimedia contents on a video source generated by an application program without requiring an extra buffer.

Figure 1:
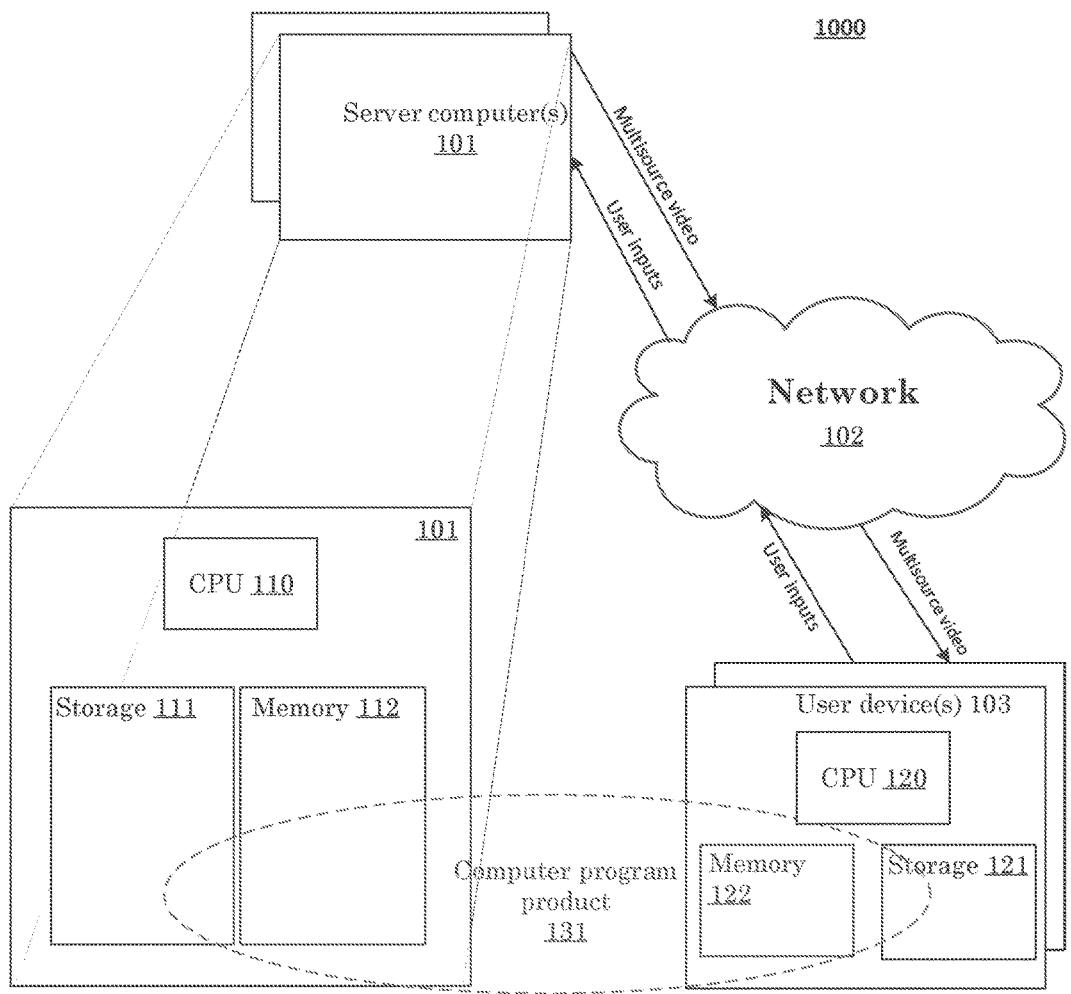
FIG. 1 is a block diagram of a distributed client-server computer system 1000 supporting interactive multisource multimedia applications according to one embodiment of the present invention.

FIG. 1 is a block diagram of a distributed client-server computer system 1000 supporting multimedia applications according to one embodiment of the present invention. Computer system 1000 includes one or more server computers 101 and one or more user devices 103 configured by a computer program product 131. Computer program product 131 may be provided in a transitory or non-transitory computer readable medium; however, in a particular embodiment, it is provided in a non-transitory computer readable medium, e.g., persistent (i.e., non-volatile) storage, volatile memory (e.g., random access memory), or various other well-known non-transitory computer readable mediums.

User device 103 includes central processing unit (CPU) 120, memory 122 and storage 121. User device 103 also includes an input and output (I/O) subsystem (not separately shown in the drawing) (including e.g., a display or a touch enabled display, keyboard, d-pad, a trackball, touchpad, joystick, microphone, and/or other user interface devices and associated controller circuitry and/or software). User device 103 may include any type of electronic device capable of providing media content. Some examples include desktop computers and portable electronic devices such as mobile phones, smartphones, multi-media players, e-readers, tablet/touchpad, notebook, or laptop PCs, smart televisions, smart watches, head mounted displays, and other communication devices.

Server computer 101 includes central processing unit CPU 110, storage 111 and memory 112 (and may include an I/O subsystem not separately shown). Server computer 101 may be any computing device capable of hosting computer product 131 for communicating with one or more client computers such as, for example, user device 103, over a network such as, for example, network 102 (e.g., the Internet). Server computer 101 communicates with one or more client computers via the Internet and may employ protocols such as the Internet protocol suite (TCP/IP), Hypertext Transfer Protocol (HTTP) or HTTPS, instant-messaging protocols, or other protocols.

Memory 112 and 122 may include any known computer memory device. Storage 111 and 121 may include any known computer storage device.

Although not illustrated, memory 112 and 122 and/or storage 111 and 121 may also include any data storage equipment accessible by the server computer 101 and user device 103, respectively, such as any memory that is removable or portable, (e.g., flash memory or external hard disk drives), or any data storage hosted by a third party (e.g., cloud storage), and is not limited thereto.

User device(s) 103 and server computer(s) 101 access and communicate via the network 102. Network 102 includes a wired or wireless connection, including Wide Area Networks (WANs) and cellular networks or any other type of computer network used for communication between devices.

In the illustrated embodiment, computer program product 131 in fact represents computer program products or computer program product portions configured for execution on, respectively, server 101 and user device 103.

Figure 2:
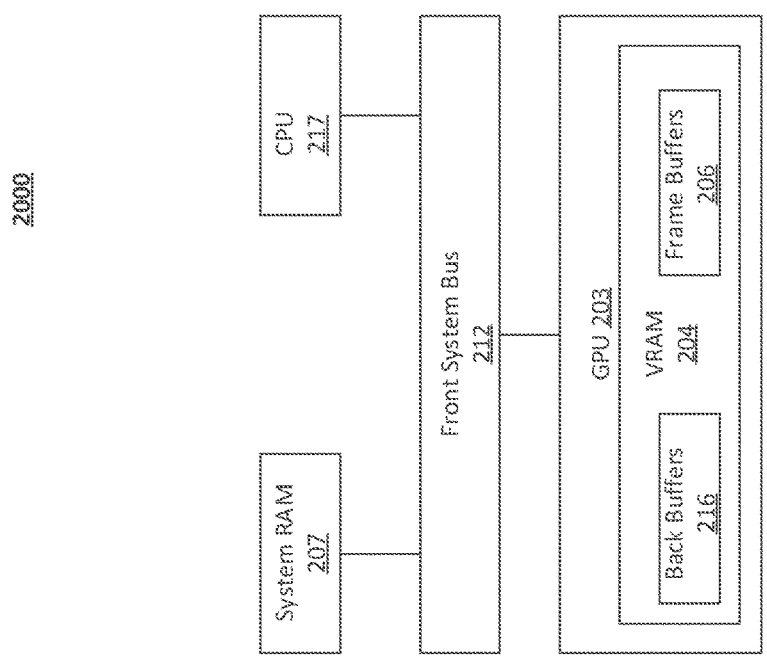
FIG. 2 is a system architecture diagram of a video processing system, in which an embodiment of the present invention may be implemented, comprising a Graphics Processing Unit (GPU) and Video Random Access Memory (VRAM).

FIG. 2 is a system architecture diagram of a video processing system 2000. Embodiments of video processing system 2000 comprise system elements that are optimized for video processing, in particular including a Graphics Processing Unit (GPU) 203 and Video Random Access Memory (VRAM) 204.

In some embodiments, video processing system 2000 also includes conventional computing elements that are not necessarily optimized for video processing, such as CPU 217 and System RAM 207.

In some embodiments, VRAM 204 comprises one or more buffers, such as Frame Buffers 206 and/or Back Buffers 216. In general, a Frame Buffer 206 is a region in memory large enough to store a complete frame of video data. Frame buffers can also be defined in other memory elements, such as System RAM 207. In some embodiments, additional buffers such as Back Buffers 216 may be provided by, for example, defining a suitable memory region in VRAM 204. In some embodiments, one or more Back Buffers 216 may be provided to support a double buffering function, in order to reduce flickering in a video display. In some embodiments, Back Buffers 216 may serve to store the results of rendering and/or blending operations, as further described below.

Video processing system 2000 may further comprise one or more interconnect mechanisms or buses, such as Front System Bus 212, in order to directly or indirectly interconnect entities such as GPU 203, VRAM 204, CPU 217, and System RAM 207.

Figure 3:
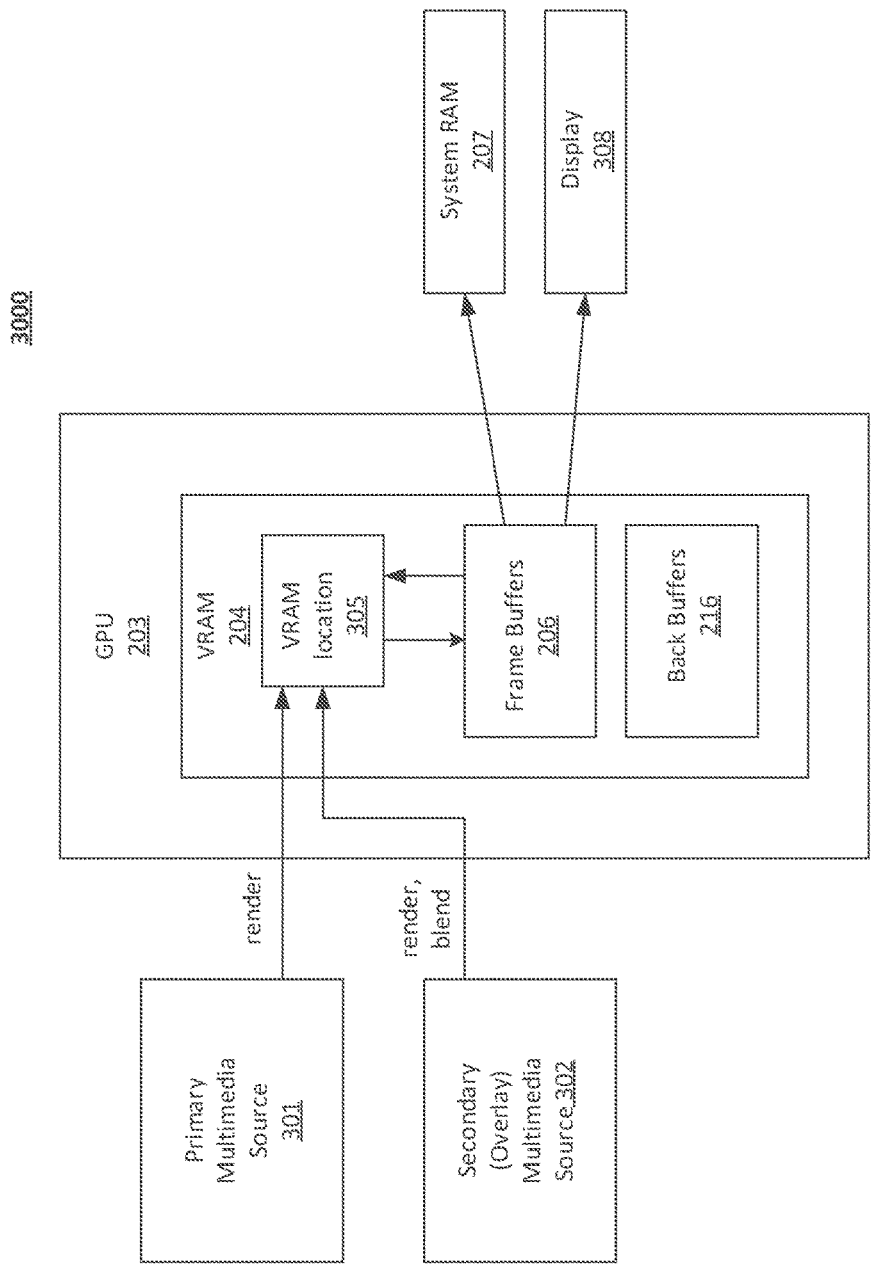
FIG. 3 is a block diagram of a system for overlaying multimedia contents on a primary source, in accordance with an embodiment of the present invention.

FIG. 3 is a high-level block diagram of a system 3000 for overlaying multisource media according to some embodiments of the present invention.

In the depicted embodiment of system 3000, Graphics Processing Unit (GPU) 203 comprises Video Random Access Memory (VRAM) 204 which in turn comprises Frame Buffer(s) 206. In general, Frame Buffer 206 is a region in memory large enough to store a complete frame of video data. VRAM 204 may comprise more than one Frame Buffer 206. As noted above, frame buffers can also be defined in other memory elements, such as System RAM 207.

In some embodiments, the processes described herein may be performed in a digital device comprising memory and a processing unit that is not described as a GPU or is actually not a GPU. In some embodiments, the GPU is part of a server. In some embodiments a server comprising a GPU is a cloud-based server. In some embodiments the GPU is part of a client device.

Primary Source 301 comprises, for example, graphics objects such as vertexes, texture, shading, mesh, etc. In a preferred embodiment, Primary Source 301 is generated by an application program and is directly rendered in VRAM 204 at VRAM location 305. In some embodiments, VRAM Location 305 comprises one of Back Buffers 216. In another embodiment, VRAM Location 305 comprises Frame Buffer 206. In one embodiment, Primary Source 301 is output from a game application. Because Primary Source 301 is directly rendered in VRAM 204, no resources need be expended in "capturing" Primary Source 301. In other embodiments, Primary Source 301 is rendered elsewhere and copied into VRAM 204.

Secondary Multimedia Source 302 can be an item of visual or multimedia content that is to be overlaid on Primary Source 301. In an embodiment, Secondary Multimedia Source 302 comprises graphics objects such as vertexes, texture, shading, mesh, etc. In one embodiment, Secondary Source 302 is generated by an application program and is directly rendered in VRAM 204. In some embodiments, Secondary Source 302 is rendered in VRAM Location 305. In some embodiments, Secondary Source 302 is generated by the same application program that generates Primary Source 301. In other embodiments, Secondary Source 302 is generated by a different application program. In still other embodiments, Secondary Source 302 can be the output of a hardware device such as a TV card. In such embodiments it may be necessary to capture Secondary Source 302 in System RAM 207 and upload it to VRAM Location 305.

In one example, Secondary Multimedia Source 302 is an advertisement that is to be overlaid on Primary Source 301. In other embodiments, Secondary Multimedia Source 302 is to be underlaid under Primary Source 301. In other embodiments, Secondary Multimedia Source 302 is to be blended with Primary Source 301 in an intermediate manner, so that, for example, both sources are visible to some degree.

In VRAM 204, one or more secondary sources 302 are blended with Primary Source 301 at a specified time and position. In some embodiments, Primary Source 301 provides time and position references to Secondary Source 302. In some embodiments, blending takes place at the same VRAM location 305 in VRAM 204 where Primary Source 301 was rendered, so no extra buffer need be used for the blending process. In some embodiments, rendering of Primary Source 301, rendering of Secondary Source 302, and blending of Primary Source 301 and Secondary Source 302 to produce a target image all take place in the same VRAM location 305. In some embodiments, rendering of Primary Source 301 and Secondary Source 302 in the same location accomplishes the desired blending, and there is no separate blending step.

After the blending process completes, in some embodiments, the target image produced by the blending process is sent to Frame Buffer 206. In some embodiments, where rendering and blending take place in Frame Buffer 206, the target image will already be in Frame Buffer 206. As a next step, the target image can be encoded to form part of the target video. The target video can then be sent to System RAM 207. In some embodiments, the target video may be sent to one of Back Buffers 216. In other embodiments, the target video may be sent directly to Display 308. In other embodiments, the target video may be rendered back to VRAM Location 305 in an iterative process, for example to accomplish multiple overlays. This option is depicted in FIG. 3 as a data path back to VRAM location 305 from Frame Buffer 206. Multiple overlays may be used, for example, to render a 3D surface or texture.

Figure 4:
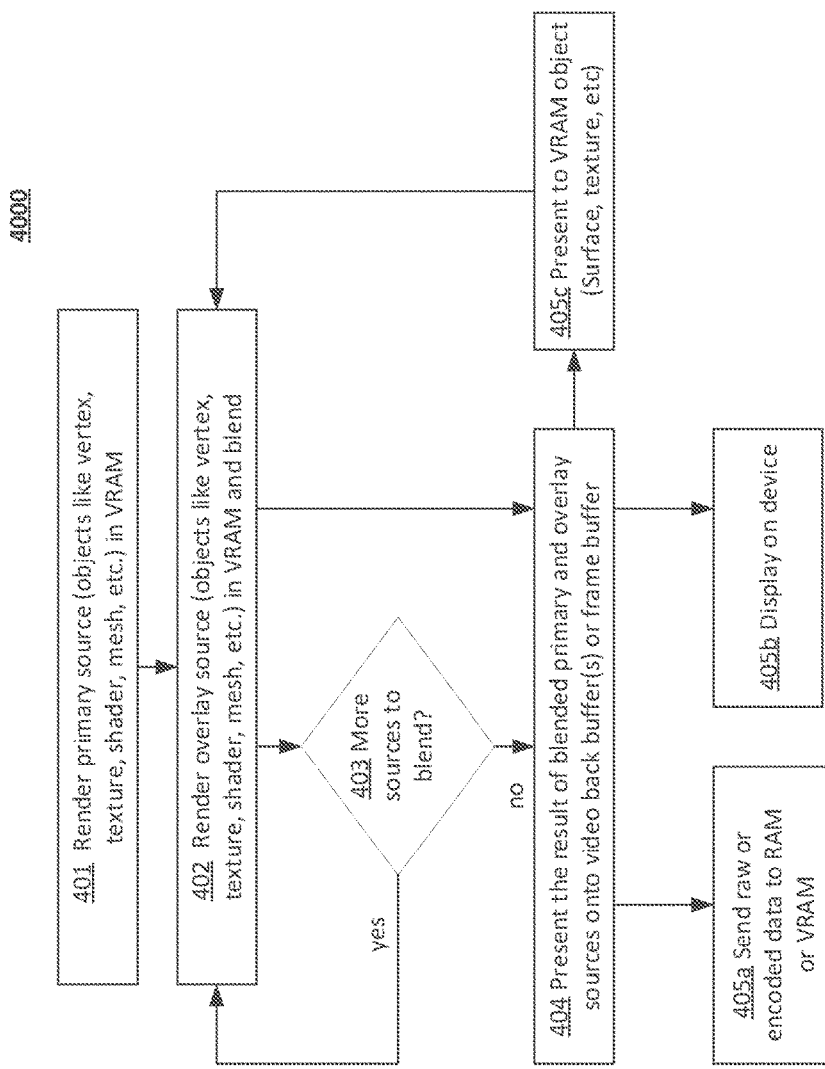
FIG. 4 is a flow diagram of a method for overlaying multimedia contents on a primary source, in accordance with an embodiment of the present invention.

FIG. 4 illustrates a process 4000 for overlaying multi-source media according to some embodiments of the present invention.

In step 401, a primary source, comprising objects such as vertexes, texture, shading, or a mesh is rendered in VRAM. In step 402, an overlay/underlay source is also rendered in VRAM and is blended with the primary source in the same VRAM location. In some embodiments, the VRAM location will correspond to one of Back Buffers 216. In some embodiments, the VRAM location will correspond to one or more of Frame Buffers 206. In other embodiments, the VRAM location will correspond to another location, different from a back buffer or frame buffer location. In at least some embodiments, rendering of the primary source and overlay/underlay source in the same location accomplishes the desired blending, and there is no separate blending step.

If there are more overlay/underlay sources, steps 402 and 403 will be repeated until all overlay/underlay sources are rendered and blended.

In step 404, the overlay/underlay result is presented in a video back buffer(s) or a frame buffer. In embodiments where the blending process takes place in a back buffer or frame buffer, step 404 may involve little or no additional work. In other embodiments, step 404 comprises sending the overlay/underlay result from VRAM Location 305 to a back buffer or frame buffer.

Steps 405a, 405b, and 405c illustrate alternative next steps of process 4000. At 405a, encoded video or raw video data is sent to system RAM or to VRAM. Raw video data might be output, for example, for a follow-on software encoding step (not shown) in the case where the GPU does not support a specific encoding format. At 405b, the overlay/underlay result is directly presented on a display device. At 405c, the overlay/underlay result is fed back to step 402 one or more times in order to accomplish multiple overlays through an iterative process.

Overlaying Interactive Content onto Game Application for Cloud Gaming

Figure 5:
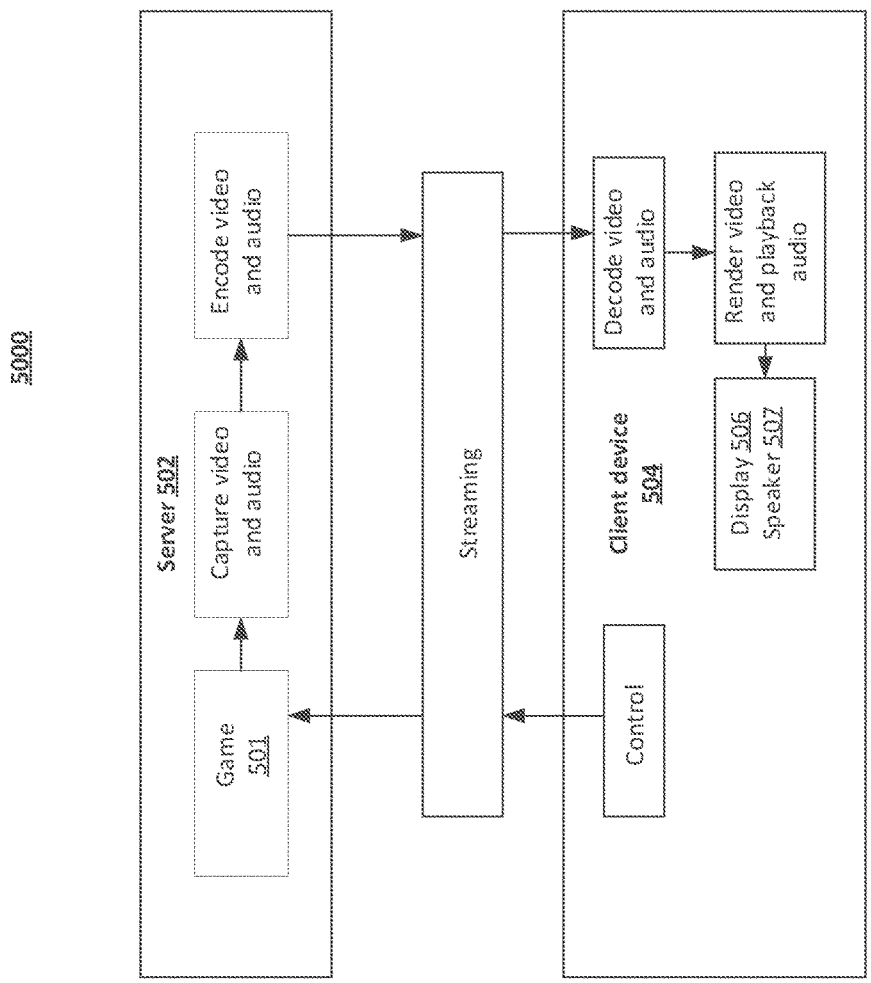
FIG. 5 illustrates a cloud gaming system and method, in accordance with embodiments of the presently claimed invention.

Cloud gaming is a type of online gaming. It is also called "game on demand." Cloud gaming basically proceeds according to the following steps (please refer to FIG. 5):

(1) Server 502 captures video and audio output of game 501.

(2) Server 502 encodes the video and audio to compressed data.

(3) Server 502 streams encoded (compressed) video and audio to client device 504.

(4) Client device 504 decodes the video and audio data.

(5) Client device 504 renders the video content to display 506 and plays back the audio content to speaker 507.

(6) Client device 504 sends control data to server 502.

In some embodiments server 502 is a cloud-based server. In some embodiments, game 501 is implemented as software running in the cloud on server 502. Each client (user) device 504, which may be, for example, a personal computer (PC), laptop, tablet, smart phone, game console, etc., has its own unique way to interact with game 501. In particular, the user interface design for a given device 504 is based on the functionalities of that device. Because it is an aim of cloud gaming to transfer game content to different types of device 504, in general additional user interface functionality is required to work with different instances of device 504. In some embodiments, the additional user interface functionality is provided by overlaying one or more user interfaces on the game video content output by game 501, without the need to modify the game 501 application.

Below we describe how additional content can overlay game video content without modifications to the game application. First, we will examine in more detail the capture and encoding steps introduced above, highlighting the advantages of exploiting the Graphics Processing Unit (GPU) and associated Video Random Access Memory (VRAM) in performing these steps.

Figure 6:
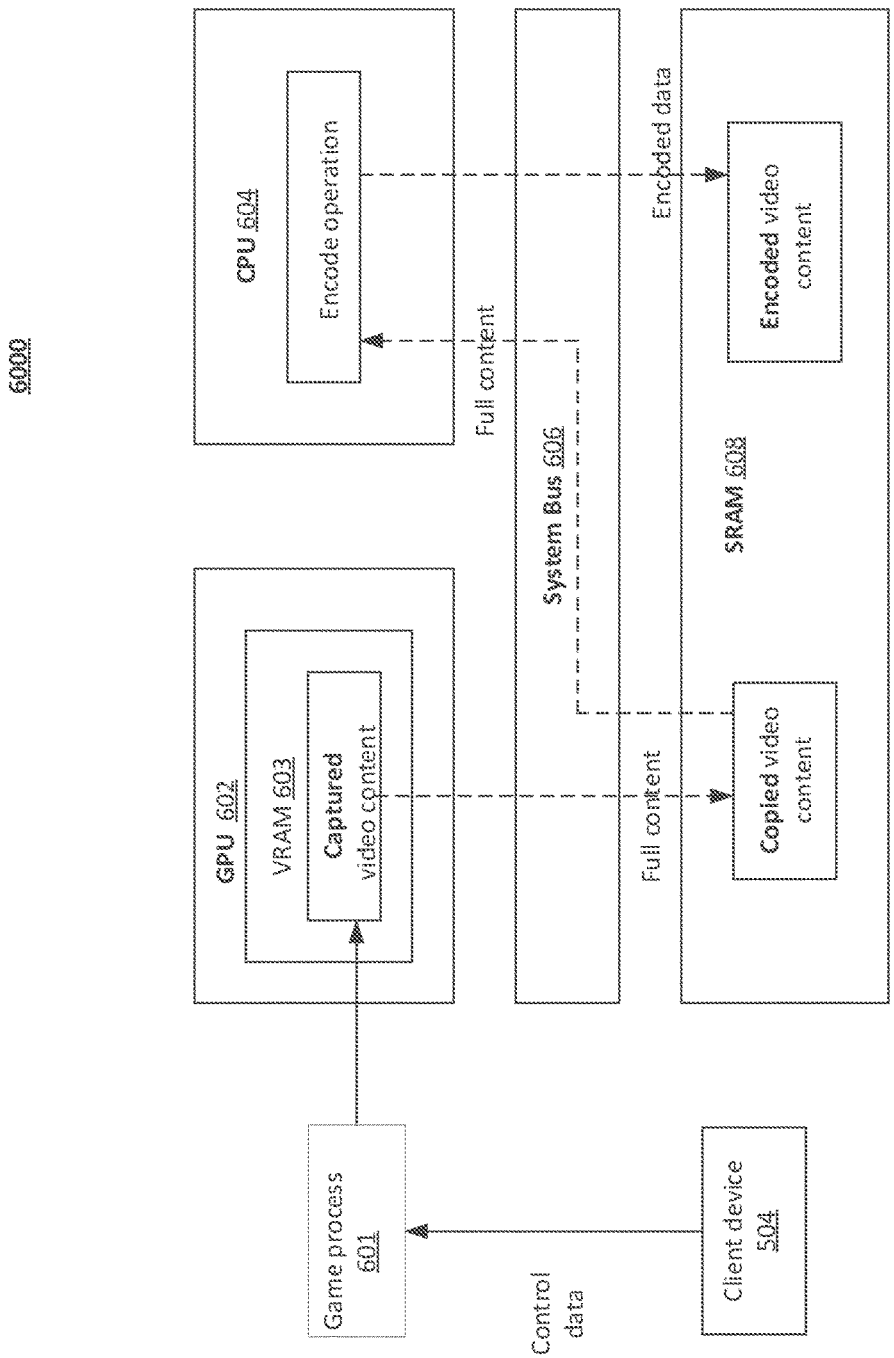
FIG. 6 illustrates a non-VRAM method of encoding video and audio content, according to embodiments of the presently claimed invention.

FIG. 6 illustrates a non-VRAM method of encoding video and audio content, in a system 6000 comprising GPU (Graphics Processing Unit) 602, VRAM (Video Random Access Memory) 603, CPU (Central Processing Unit) 604, System Bus 606, and SRAM (System Random Access Memory) 608. This method comprises 2 major steps: 1) Copy the video content from VRAM 603 to SRAM 608; and 2) Encode the copied video content from SRAM 608 in CPU 604.

This method of capturing and encoding video content exacts a very large performance penalty, because raw (unencoded) video data has to pass over System Bus 606. In fact, as shown, the raw video data passes over System Bus 606 twice.

Figure 7:
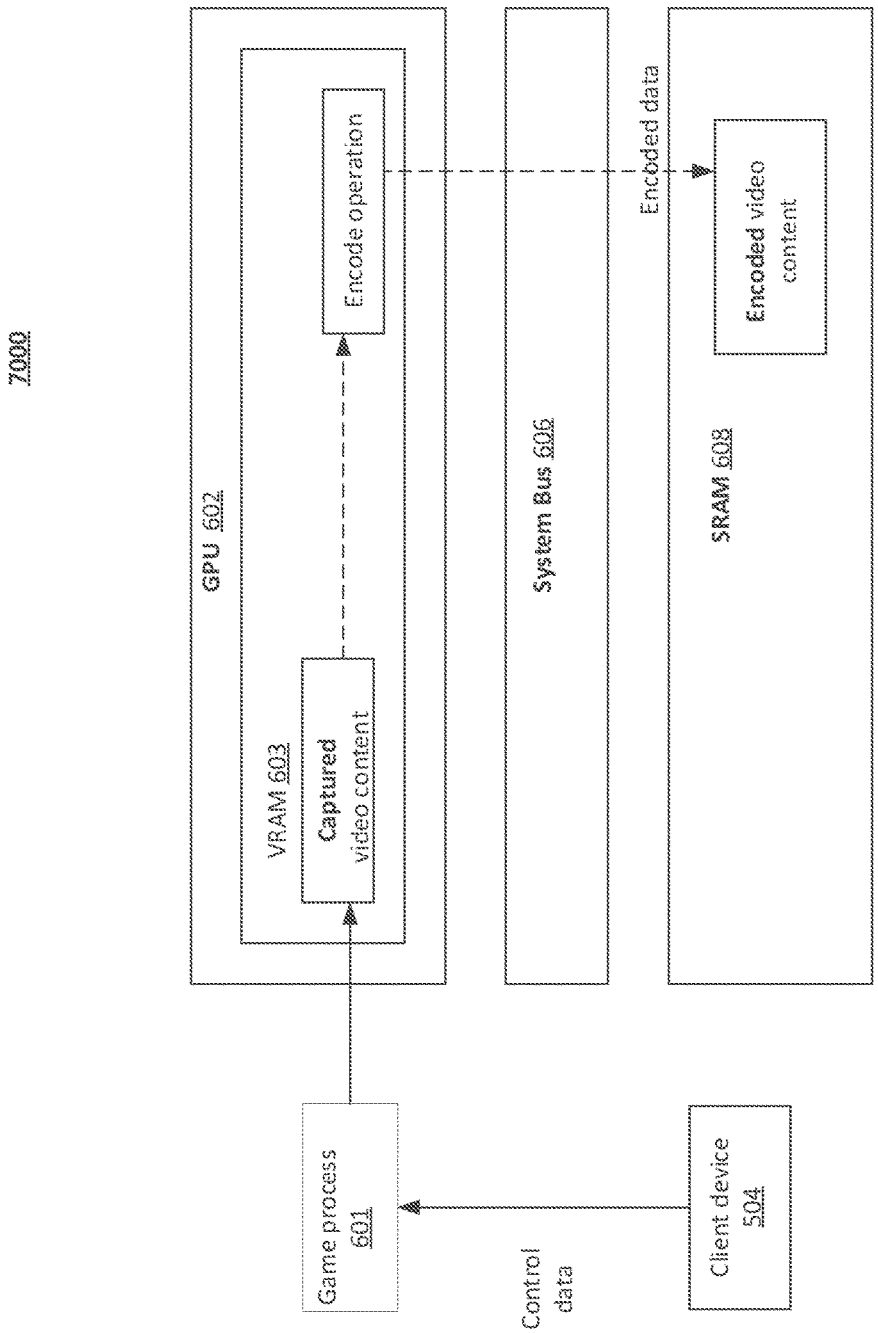
FIG. 7 illustrates a VRAM-based method of encoding video and audio content, according to embodiments of the presently claimed invention.

FIG. 7 illustrates an improved method of encoding video and audio content in a system 7000 that takes greater advantage of the capabilities afforded by GPU 602 and associated VRAM 603.

Here, as may be seen in FIG. 7, video content is captured in VRAM, as before, but then remains in VRAM, where the encoding operation is performed using GPU and VRAM resources. The encoded video data is then sent over system bus 606 to SRAM 608. Thus, instead of carrying raw video data twice for each encode operation, system bus 606 carries encoded (compressed) video data once. This results in resource savings for CPU 604 and SRAM 608, as well as system bus 608 resource savings.

Figure 8:
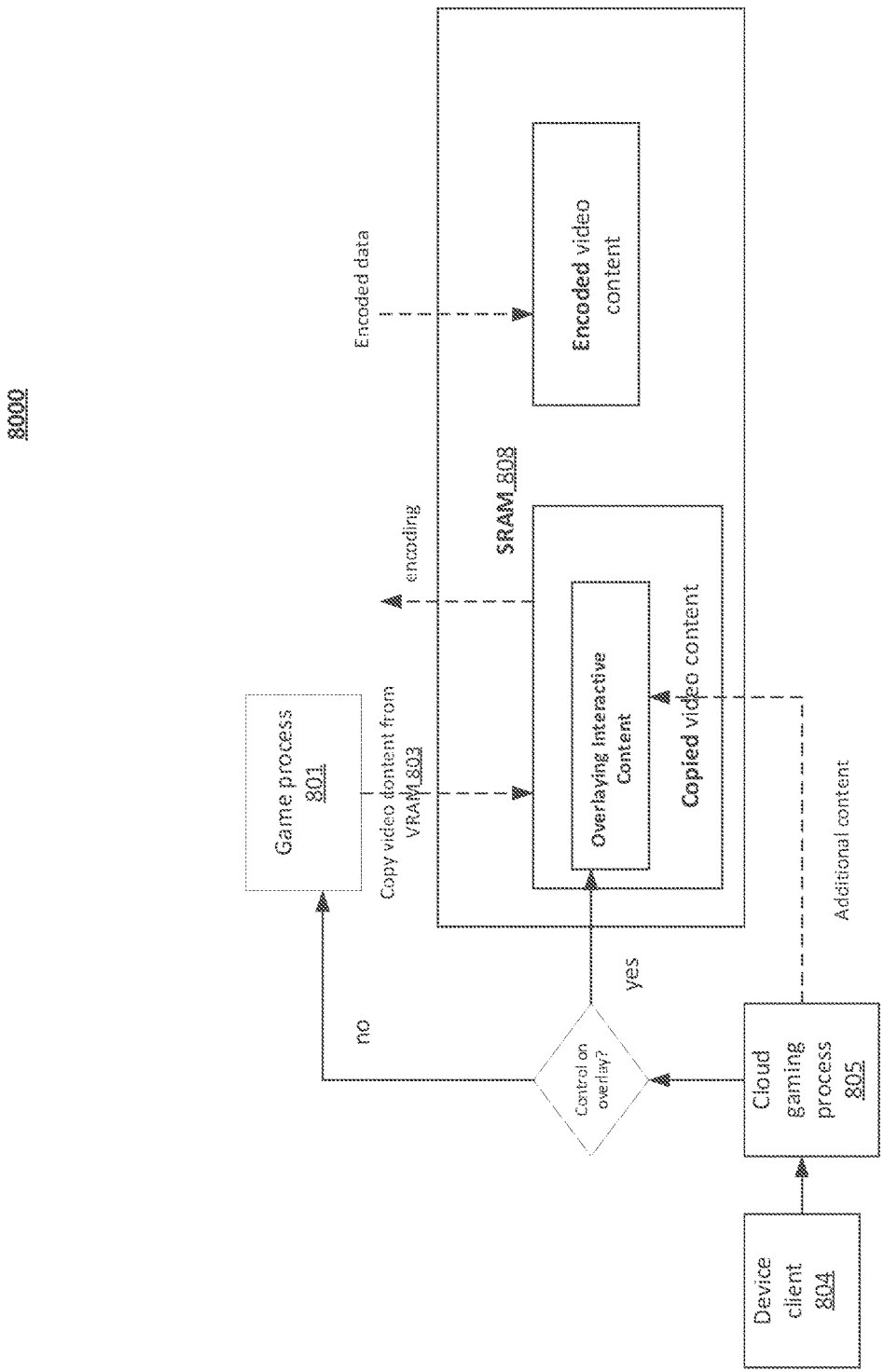
FIG. 8 illustrates a system and method for overlaying interactive content in SRAM, according to embodiments of the presently claimed invention.
Figure 9:
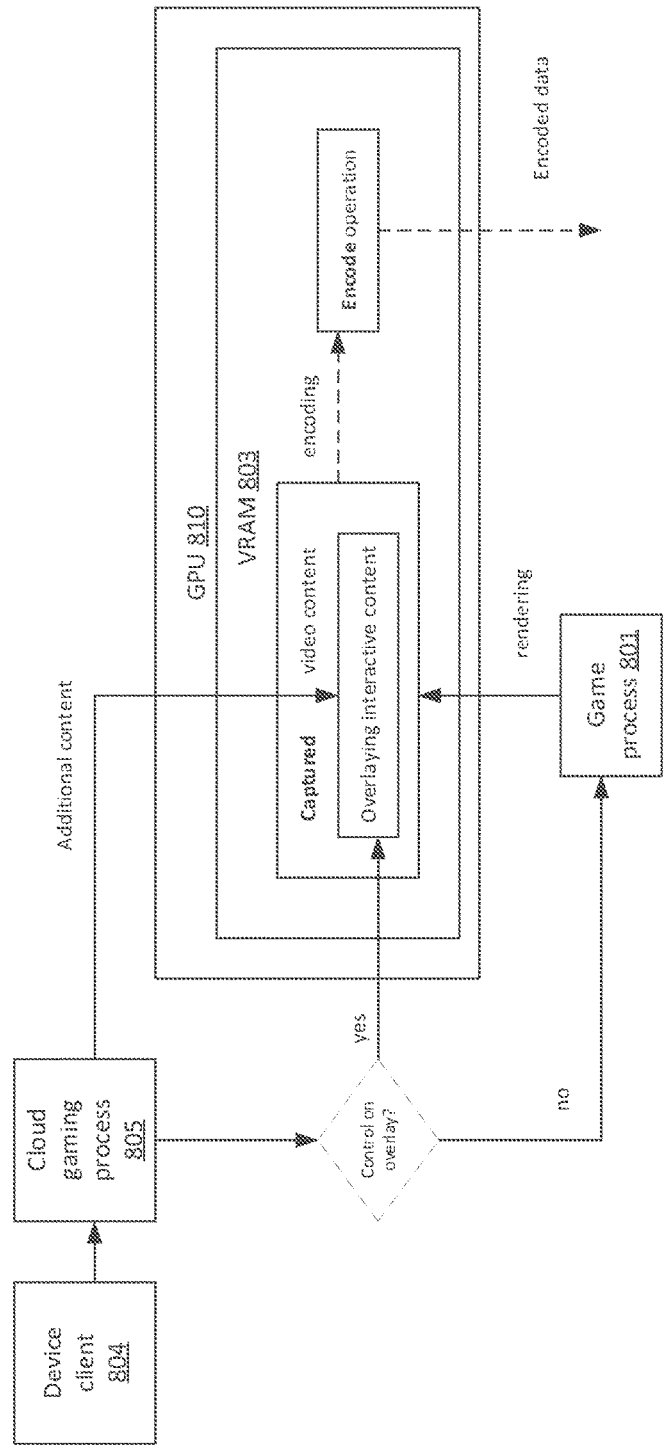
FIG. 9 illustrates a system and method for overlaying interactive content in VRAM, according to embodiments of the presently claimed invention.

FIGS. 8 and 9 illustrate methods and apparatus for overlaying additional interactive content in cloud gaming applications, according to some embodiments of the presently claimed invention. In some embodiments overlaid additional interactive content comprises a user interface (UI). In some embodiments overlaid content comprises extra content. In some embodiments overlaid additional interactive content comprises interactive control. In preferred embodiments, such as those illustrated in FIG. 9, GPU resources and VRAM are exploited to overlay cloud gaming-specific content and provide the user with an improved gaming experience.

Game process 801 comprises, for example, the target process or application which provides content to a user. Cloud gaming process 805 facilitates remote play of the game by, for example, providing content to a user and inputting remote control from a user. Cloud gaming process 805 communicates with the game process by injecting code within game process 801. In some embodiments, cloud gaming process 805 decides which overlay to draw. In some embodiments, cloud gaming process 805 passes user control information to injected code.

Cloud gaming process 805 communicates with device client 804 (also referred to as client device 804), which is a hardware device, such as a smartphone, set-top box, or gaming console. In some embodiments, cloud gaming process 805 helps to stream encoded video data to device client 804.

In some embodiments, overlaid interactive content comprises one or more displayed advertisements. In some embodiments, overlaid interactive content comprises a device control interface customized to fit one or more particular devices. In some embodiments, overlaid content comprises one or more output video sources.

Preferably, the illustrated methods and apparatus provide a cloud gaming service that uses process interception to run within a game application, without requiring modification of the game application. In some embodiments, the cloud gaming service employs a dynamic link library injection technique (DLL Injection) to facilitate running within a game application (or other application). In some embodiments, the cloud gaming service employs a "hooking" technique to facilitate running within a game application (or other application).

See http://en.wikipedia.org/wikild/DLL_injection: "In computer programming, DLL injection is a technique used for running code within the address space of another process by forcing it to load a dynamic-link library."

See https://en.wikipedia.org/wiki/Hooking: "In computer programming, the term hooking covers a range of techniques used to alter or augment the behavior of an operating system, of applications, or of other software components by intercepting function calls or messages or events passed between software components. Code that handles such intercepted function calls, events or messages is called a hook."

In some embodiments, the cloud gaming service employs both DLL Injection and hooking to facilitate running within an application, such as a game application.

In preferred embodiments, the cloud gaming service is able to create the same type of rendered target content as a game application that uses standard graphics APIs such as DirectX or OpenGL. Preferably, the cloud gaming service utilizes one or more embodiments of the presently claimed invention to provide the user with one or more of an on-screen keyboard, a virtual mouse, dialog information and one or more advertisements. In embodiments of the presently claimed invention, additional user interface functionality and information, such as the on-screen keyboard, virtual mouse, dialog information, and advertisements can be provided without modification of the game application.

FIG. 8 illustrates methods and apparatus for overlaying interactive content in SRAM (System Random Access Memory) 808. Interactive content can include, for example, media or gaming content in which the content can respond to user control actions. In the method of FIG. 8, the overlay is generated in SRAM 808 and the overlay is blended to the game video content before encoding. This method is relatively low-level and consumes relatively more processing time and other resources. User control data is passed to cloud gaming process 805. If the overlay includes user control data, it will be handled by cloud gaming process 805 before passing to game process 801. In the method of FIG. 8, encoding can be handled by a CPU or in VRAM (not shown).

FIG. 9 illustrates methods and apparatus for overlaying interactive content on VRAM (Video Random Access Memory) 803. In this method, the cloud gaming service directly creates a compatible overlay surface in VRAM 803 and blends the overlay surface to the game content. This saves processing time and resources by eliminating the need to copy content from VRAM 803 to SRAM 808 and eliminating the need to perform the blending operation in the SRAM 808 and CPU 604.

A compatible overlay surface is, for example, one which is compatible with the existing game application. For example, if the game application uses the DirectX9 API, then the cloud gaming services will also use DirectX9 for compatibility.

In FIG. 9, the output from Game process 801 labeled "rendering" represents rendering by the game application. In some embodiments, the cloud gaming service "hooks" the game application at the end of each game rendering operation, causing the game to actively call the injection code of the cloud gaming service. See discussion of "hooking" and DLL Injection above.

In the embodiment of FIG. 9, encoding is preferably carried out within VRAM 803. Encoded data (which may be compressed data) is then sent to, for example, Client device 804, which may be located remotely.

Although a few exemplary embodiments have been described above, one skilled in the art will understand that many modifications and variations are possible without departing from the spirit and scope of the present invention. Accordingly, all such modifications and variations are intended to be included within the scope of the claimed invention.

What is claimed is:

1. In a cloud gaming service, a method for overlaying interactive content onto a game application, the method comprising:
    capturing, in VRAM, video content from a game application by using a game process;
    receiving a remote control input from a client device at a cloud gaming process, the cloud gaming process then communicating, based on the remote control input, with the game process by injecting code within the game process;
    creating a compatible overlay surface on the VRAM, the overlay surface being created by the cloud gaming process based on the received remote control input; and
    blending the overlay surface to the captured video content,
    wherein the game process performs one or more rendering operations, and the cloud gaming process hooks the game process at the end of each game rendering operation, causing the game process to actively call the code injected by the cloud gaming process.

2. The method of claim 1 further comprising performing, in the VRAM, an encode operation on the captured and overlaid video content.

3. The method of claim 1, wherein the cloud gaming service uses process interception to run within the game application.

4. The method of claim 1, wherein the overlaid interactive content comprises a user interface.

5. The method of claim 1, wherein the overlaid interactive content comprises extra content.

6. The method of claim 1, wherein the overlaid interactive content comprises interactive control.

7. The method of claim 1, wherein the overlaid interactive content comprises cloud-gaming specific content.

8. The method of claim 1, wherein the overlaid interactive content comprises one or more advertisements.

9. The method of claim 1, wherein the overlaid interactive content comprises a device control interface customized to fit one or more particular devices.

10. The method of claim 1, wherein the cloud gaming service provides one or more of an on-screen keyboard, a virtual mouse, and dialog information, without modification of the game application.

11. A system for overlaying interactive content onto a game application, comprising:
a Graphics Processing Unit (GPU) and
a Video Random Access Memory (VRAM) coupled to the GPU,
the GPU being configured to:
capture, in the VRAM, video content from a game application by using a game process;
receive a remote control input from a client device at a cloud gaming process, the cloud gaming process then communicating, based on the remote control input, with the game process by injecting code within the game process;
create a compatible overlay surface overlaying the captured video content, the overlay surface being created by the cloud gaming process based on the received remote control input; and
blend the overlay surface to the captured video content,
wherein the game process performs one or more rendering operations, and the cloud gaming process hooks the game process at the end of each game rendering operation, causing the game process to actively call the code injected by the cloud gaming process.

12. The system of claim 11, wherein the GPU is further configured to perform an encode operation on the captured and overlaid video content.

13. The system of claim 11, wherein the GPU is further configured to use process interception to run within the game application.

14. The system of claim 11, wherein the overlaid interactive content comprises a user interface.

15. The system of claim 11, wherein the overlaid interactive content comprises extra content.

16. The system of claim 11, wherein the overlaid interactive content comprises interactive control.

17. The system of claim 11, wherein the overlaid interactive content comprises cloud-gaming specific content.

18. The system of claim 11, wherein the overlaid interactive content comprises one or more advertisements.

19. The system of claim 11, wherein the overlaid interactive content comprises a device control interface customized to fit one or more particular devices.

20. The system of claim 11, wherein the cloud gaming service provides one or more of an on-screen keyboard, a virtual mouse, and dialog information, without modification of the game application.

21. A computer program product in a non-transitory computer-readable medium comprising instructions executable by a GPU to:
capture, in VRAM, video content from a game application by using a game process;
receive a remote control input from a client device at a cloud gaming process, the cloud gaming process then communicating, based on the remote control input, with the game process by injecting code within the game process;
create a compatible overlay surface on the VRAM, the overlay surface being created by the cloud gaming process based on the received remote control input;
blend the overlay surface to the captured video content; and
perform, in the VRAM, an encode operation on the captured and overlaid video content,
wherein the game process performs one or more rendering operations, and the cloud gaming process hooks the game process at the end of each game rendering operation, causing the game process to actively call the code injected by the cloud gaming process.

* * * * *